United States Patent [19]
Katsuno et al.

[11] Patent Number: 5,345,317
[45] Date of Patent: Sep. 6, 1994

[54] HIGH EFFICIENCY CODING METHOD FOR STILL NATURAL IMAGES MINGLED WITH BI-LEVEL IMAGES

[75] Inventors: Satoshi Katsuno; Toshiaki Endoh, both of Tokyo, Japan

[73] Assignee: Kokusai Denshin Denwa Kabushiki Kaisha, Tokyo, Japan

[21] Appl. No.: 983,670

[22] Filed: Dec. 1, 1992

[30] Foreign Application Priority Data

Dec. 19, 1991 [JP] Japan .................................. 3-353952
Jul. 3, 1992 [JP] Japan .................................. 4-200500

[51] Int. Cl.$^5$ ........................................... H04N 1/415
[52] U.S. Cl. .................................... 358/429; 358/432; 358/433; 358/261.3
[58] Field of Search ............. 358/429, 432, 433, 261.3

[56] References Cited

U.S. PATENT DOCUMENTS

| | | | |
|---|---|---|---|
| 4,196,448 | 4/1980 | Whitehouse et al. | 358/432 |
| 4,266,249 | 5/1981 | Chai et al. | 358/432 |
| 4,558,370 | 12/1985 | Mitchell et al. | 382/56 |
| 4,788,598 | 11/1988 | Ochi et al. | 358/429 |
| 5,101,438 | 3/1992 | Kanda et al. | 358/432 |
| 5,121,216 | 6/1992 | Chen et al. | 358/432 |
| 5,189,526 | 2/1993 | Sasson | 358/432 |

*Primary Examiner*—Edward L. Coles, Sr.
*Assistant Examiner*—Kimberly A. Williams
*Attorney, Agent, or Firm*—Emmanuel J. Lobato

[57] ABSTRACT

An original grayscale image or color image to be coded is processed by a bi-level image mingled still image coding system to produce a differential image. The original image and the differential image are compared for each pixel block. Only those of the pixel blocks for which the bi-level image mingled still image coding system will be more efficient than a natural image coding system are encoded by the bi-level image mingled still image coding system, and the other pixel blocks are encoded by the natural image coding system. The coding method of the present invention is directed to a grayscale or color image containing an area where pixel values undergo an abrupt change, such as an edge of a letter, or a document with multi-color and natural color images intermingled therein. The method of the present invention obtains a less deteriorated coded image even from an image in which the edge area is very blunt, and moreover, the invention permits high efficiency coding.

3 Claims, 17 Drawing Sheets

IMAGE B

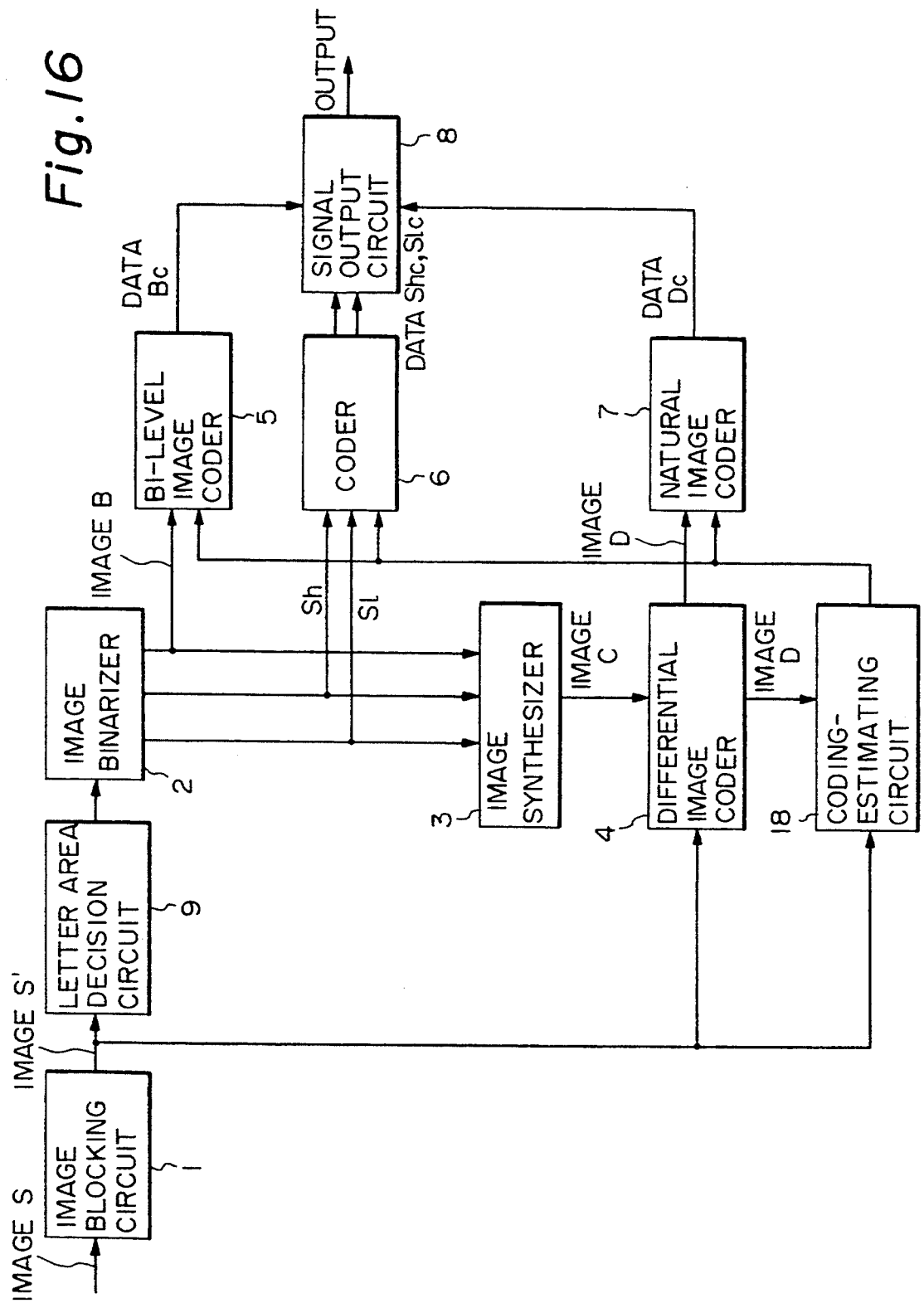

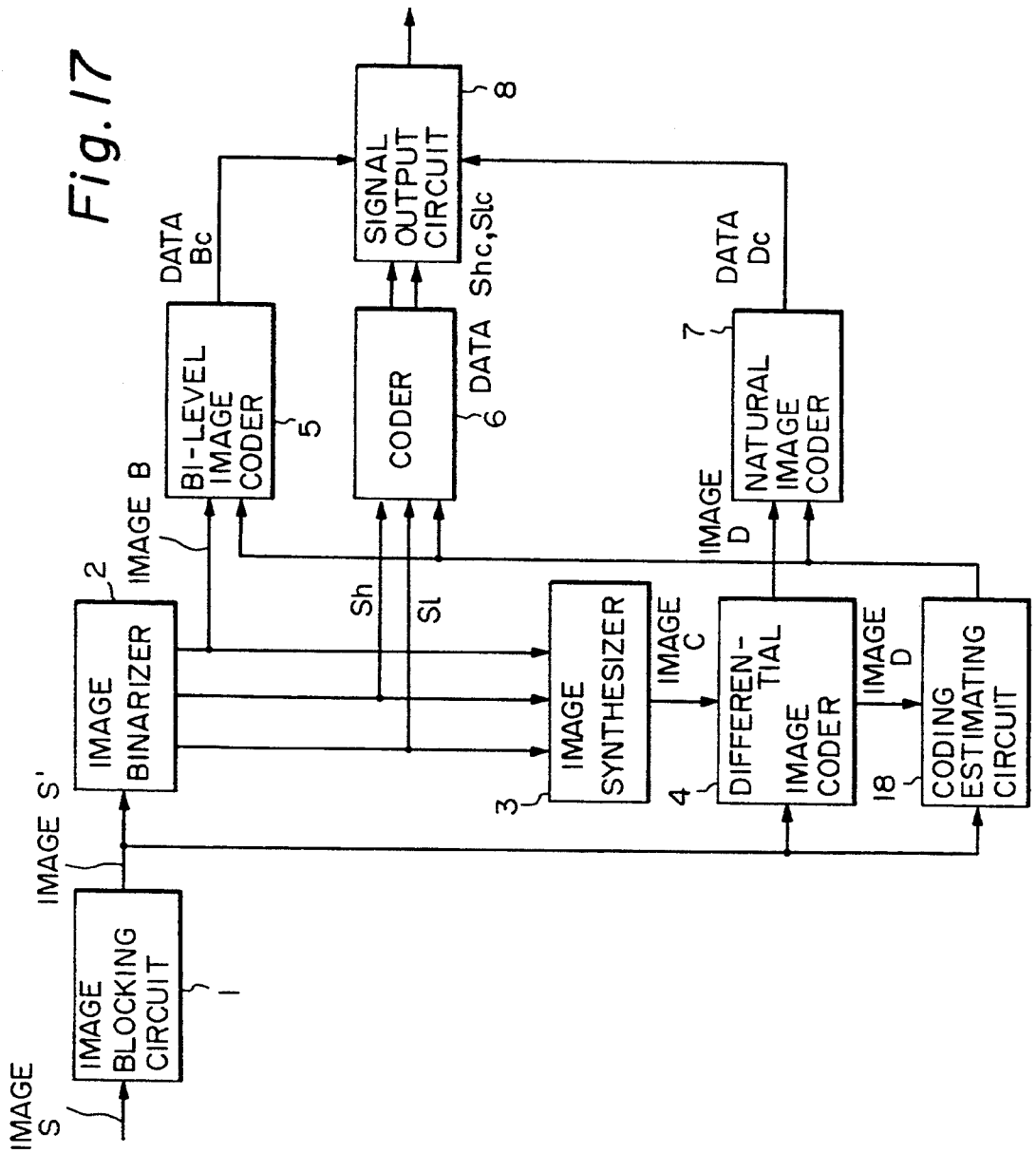

HIGH EFFICIENCY CODING METHOD FOR STILL NATURAL IMAGES MINGLED WITH BI-LEVEL IMAGES

BACKGROUND OF THE INVENTION

The present invention relates to a high efficiency coding method for grayscale or color images.

Heretofore there have been proposed a variety of coding systems for still color images (including graded images) and, in particular, two international standard systems called a JPEG system and a JBIG system, developed jointly by CCITT SG VIII and IEC/JTC1/SC29, have lately attracted considerable attention.

The JPEG (Joint Photographic Experts Group) system, proposed as a still color image coding system, is not an information preserving type but a system which permits high efficiency coding of grayscale or color images.

The JPEG system adopts a discrete cosine transform (DCT) system, one of orthogonal transform systems which are highly efficient for still color images, in general. The DCT system is one that divides an image into blocks, conducts a discrete cosine transformation for each block and encodes the resulting output coefficient. The output coefficient is quantized independently for each frequency component and a particular number of quantizing bits is assigned for each transformation coefficient so as to provide for an optimum coding efficiency. Since the still color image contains a large amount of information, it is not practical to employ a coder free from information loss for coding the still color image, unlike in the case of coding binary images. The coding of the still color image calls for quantization at a suitable level and a coarse quantization in the high frequency region, in general, will provide a high degree of coding efficiency.

On the other hand, the JBIG (Joint Bi-level Image Expert Group) system, proposed as an international standard system for the coding of bi-level images, is an information preservation type coding method which permits high efficiency coding of images basically represented in a bi-level form, with no drop-out of information.

It is assumed that images for transmission by facsimile are multi-color documents mostly with monochrome letters and color images or color and monochrome letters and color images intermingled therein, rather than documents with color images alone. However, a coding system which employs the DCT technique, such as the JPEG system, has a shortcoming that the picture quality of a letter area is seriously deteriorated in the case of a document with letters and images intermingled therein. In view of the above, there have been proposed several methods which obviate the above-mentioned defect of the prior art and permits high efficiency coding of a document with binary letters and grayscale images intermingled therein or a binary color document.

As mentioned above, in the case of applying the conventional discrete cosine transform (DCT) coding method to the color image, the image quality is impaired by the generation of noise around edges of letters contained in the image, for the reason given below. In the DCT process edges of letters, which undergo sudden changes in their pixel values, are also quantized, and since the pixel values of such letter edges greatly differ from the adjoining pixel values, the image inevitably contains many high frequency components. Hence, efficient quantization of such an image is equivalent to its rough quantization, and as a result, noise around letters cannot be ignored.

Moreover, in the case of applying the above-noted prior art method to the coding of an image in which letter edge areas have been blunted or emphasized by scanning, the number of coding bits increases when the letter edge areas are very blunt, because image properties substantially differ with images.

SUMMARY OF THE INVENTION

It is therefore an object of the present invention to provide a high efficiency coding method for still natural images mingled with bi-level images which is suitable for use in the facsimile transmission of documents wherein grayscale images and color images containing sharp edge areas, or multi-color images and natural images are intermingled. With the present invention, images with remarkably blunt edge areas can also be coded with less deteriorated picture quality than in the past and with improved efficiency.

According to the present invention, letter areas (including color letters as well as monochrome letters) which do not suit a conventional natural image coding system are separated, on the coding side, from grayscale images or color images, and such letter areas are coded by a bi-level image coding system, whereas the other remaining images are coded by the natural image coding system. On the decoding side, the images thus coded by different coding systems are decoded accordingly and the thus decoded images are synthesized into the original images.

BRIEF DESCRIPTION OF THE DRAWINGS

FIG. 16 is a block diagram illustrating another example of the coding apparatus embodying the present invention; and FIG. 17 is a block diagram illustrating still another example of the coding apparatus embodying the present invention.

DESCRIPTION OF THE PREFERRED EMBODIMENTS

Figure 1:
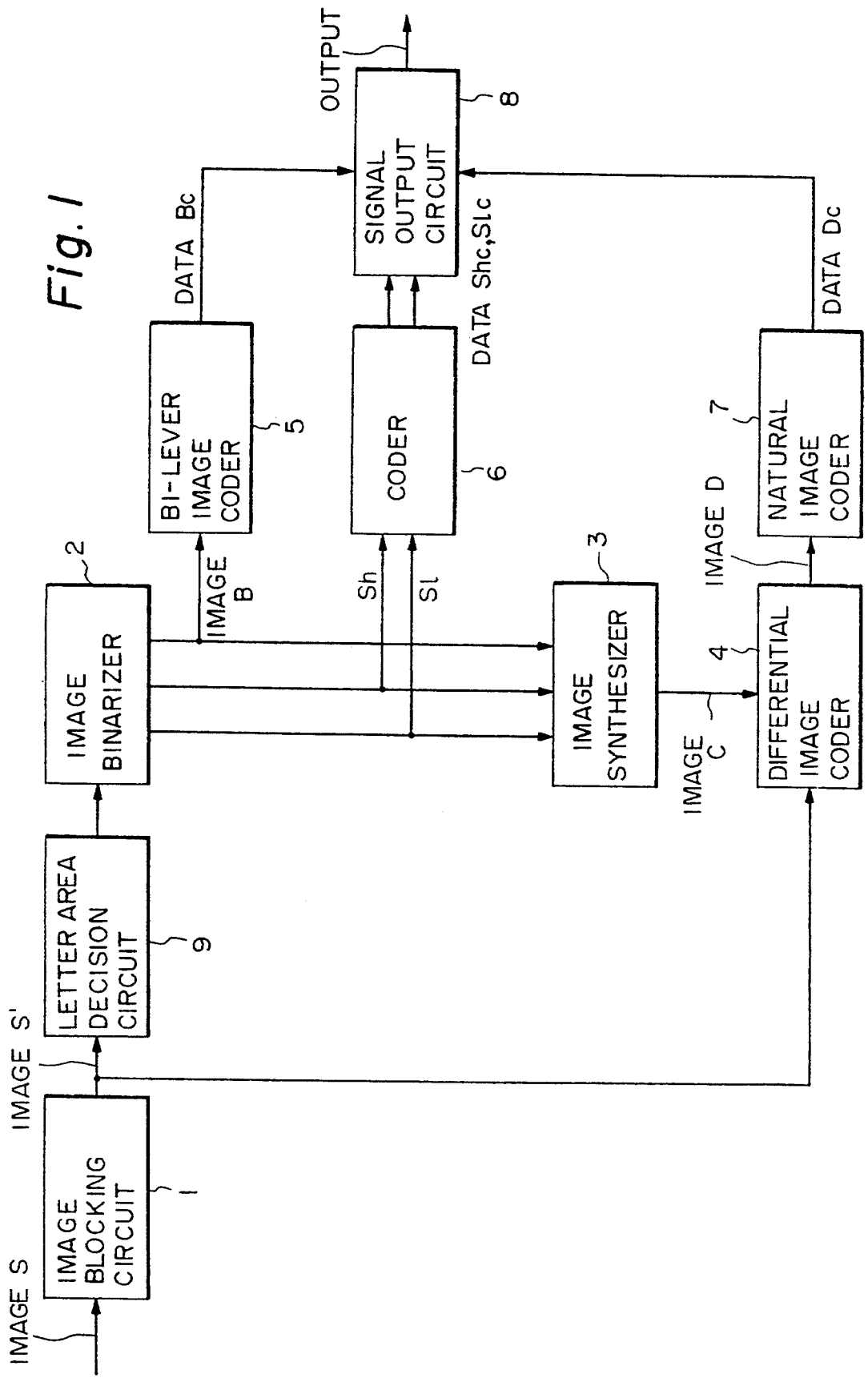
FIG. 1 is a block diagram of a coding apparatus embodying the present invention.

A detailed description will be given first of the principles of the present invention.

On the coding side, the original image to be coded is divided into pixel blocks, which are checked one by one for the presence of areas which do not suit the conventional natural image coding system, such as the aforementioned letter areas, through use of methods mentioned below. Thereafter, the letter areas thus detected are processed into binary form.

The detection (or decision) of letter areas and their extraction processing obtain features of letter areas as referred to below. The following methods may be used singly or in combination.

(1) Letters areas have a feature that a difference in value between adjoining pixels is larger than in natural images. This feature is used to detect letters areas. A maximum pixel value and a minimum pixel value in each pixel block are detected and, based on the difference between them, it is determined whether the pixel block is a letter area.

Moreover, letter areas usually have a feature that pixel values are limited specifically to those forming letters and their backgrounds. This property or feature can be used to detect letter areas. In this instance, the distribution of pixel values in each pixel block, and when there are one or two values which many pixels in the block have in common, the pixel block is decided to be a letter area.

Let the maximum pixel value and a minimum pixel value in the block be represented by Smax and Smin, respectively. When the difference F between them is equal to or greater than a certain threshold value T, the block is decided to a letter area containing edges.

(2) Generally, speaking, the background of the letter area has a simple color arrangement (or tone) in many cases, and the values of pixels forming the letter and the background, respectively, center on particular values. This feature can also be utilized to detect letter areas. In this case, the distribution of pixel values in the pixel block, and when there are one or two values which many pixels in the block have in common, the pixel block is decided to be a letter area.

To check the possible distribution of pixel values in the block, a histogram is prepared which shows the number of pixels, H(x), which take a particular pixel value x. The histogram and a certain threshold value (or parameter) M are used to check the pixel value x which satisfies the following condition:

$$H(x) - H(x-1) > M \text{ and } H(x) - H(x+1) > M$$

This values x is regarded as a peak of the distribution. When one or two such peak values are found, the pixel block is decided to be a letter area.

The letter area decision and extraction processing are intended to reduce the coding bit number of a binarized bi-level image which is generated by bi-level coding of bi-level processing described later. This processing is not always needed to improve the image quality by coding.

Next, a description will be given of the bi-level coding of the letter area.

The processing starts with obtaining a threshold value S(a) which is used to classify pixel values into two values according to their concentration in one pixel block. The threshold value S(a) is obtained by computing, for example, a simple means of the concentration of the pixels in the block. In the block decided to contain a letter area by the above-mentioned letter area extraction processing, a binarized image (hereinafter referred to as a bi-level image) B is provided wherein the pixels each represent a "1" or "0" depending on whether it is greater or smaller than the threshold value S(a). When the pixel block was decided not to contain a letter area, it is not subjected to this bi-level coding. In this instance, the pixels in the bi-level image B all go to "1's".

Following this, information on the concentration of the bi-level images in the block is generated as described below. In the block decided to contain the letter area, there are areas of the "1" binary pixels and of the "0" binary pixels, respectively. The mean value of the pixel concentration is computed for each area to obtain the concentration information of the image. In the following description, the simple mean of the pixel values in the "1" areas in the bi-level image is represented by Sh and the simple means of the pixel values in the "0" area is represented by Sl The bi-level image B and the simple mean values Sh and Sl (i.e. tone information) are used to obtain an image C wherein the pixels of the bi-level image B are each replaced with the value Sh or Sl, depending on whether the pixel value is a "1" or "0".

Next, each pixel value of the image C is subtracted from the pixel value of the original image S to generate an image D. The pieces of tone information Sh and Sl, obtained by the bi-level coding of the image B, are coded and the image D is coded into a color image (a natural image), after which each coded data is sent as a signal to the decoding side.

The color image coding employs the conventional DCT system. For instance, the image is divided into respective color components y, cb and cr, and as in the case of the above-said bi-level image, the image is processed for each color component to provide images Dy, Dcb and Dcr, which are coded subsequently.

Figure 7:
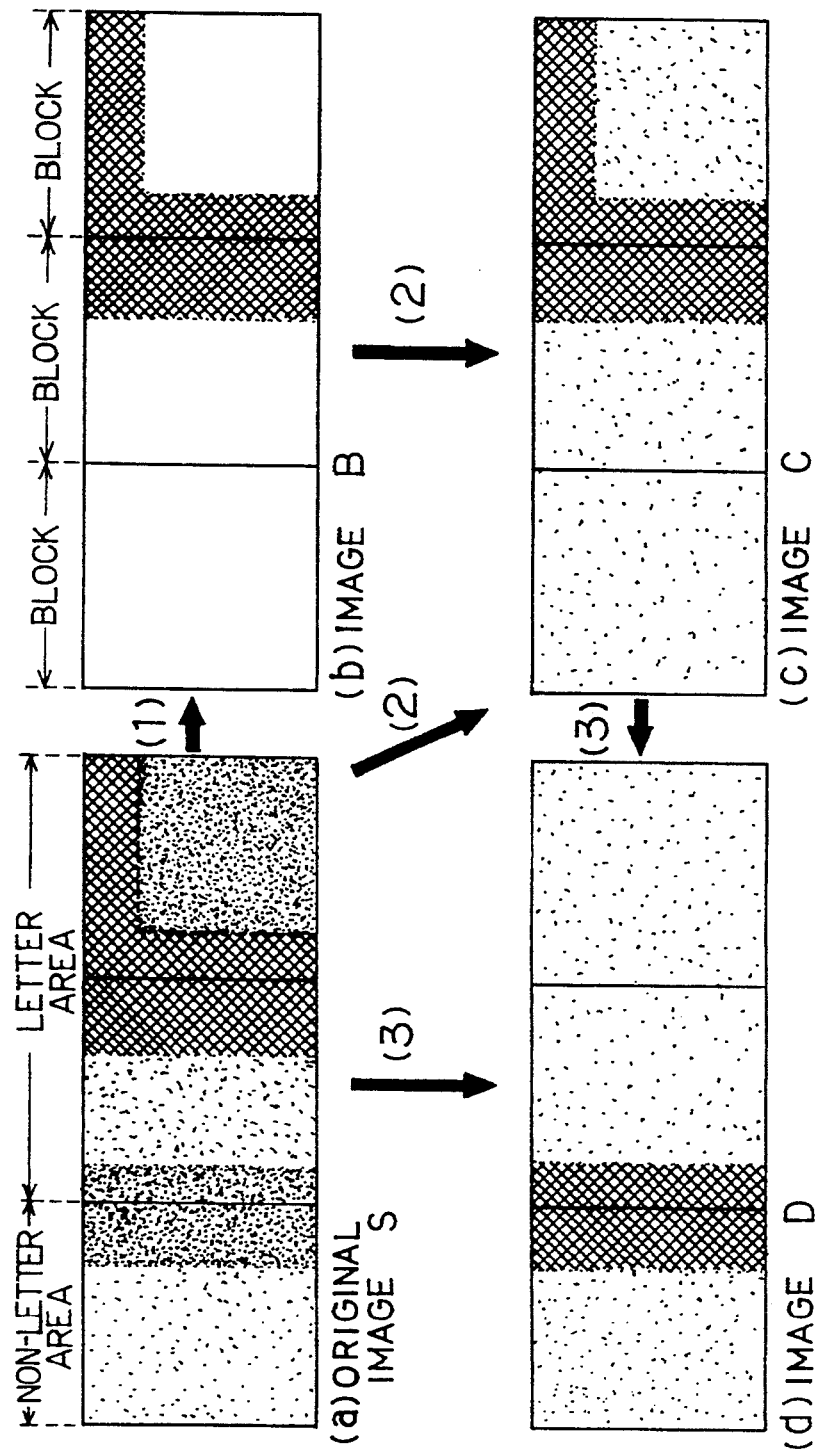
FIG. 7 shows a sequence of steps involved in the image processing according to the present invention.
Figure 8:
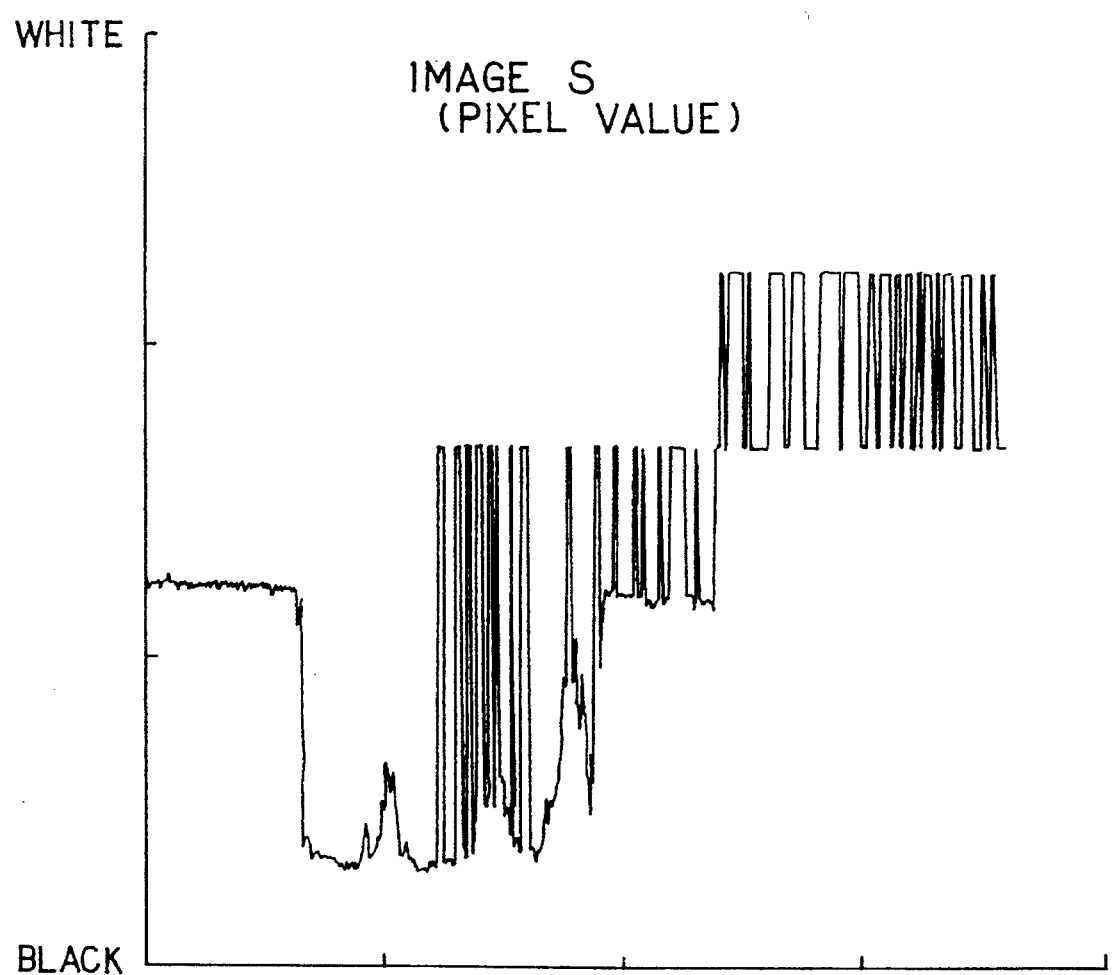
FIG. 8 is a waveform diagram illustrating a sample of an original image S which is processed according to the present invention.
Figure 9:
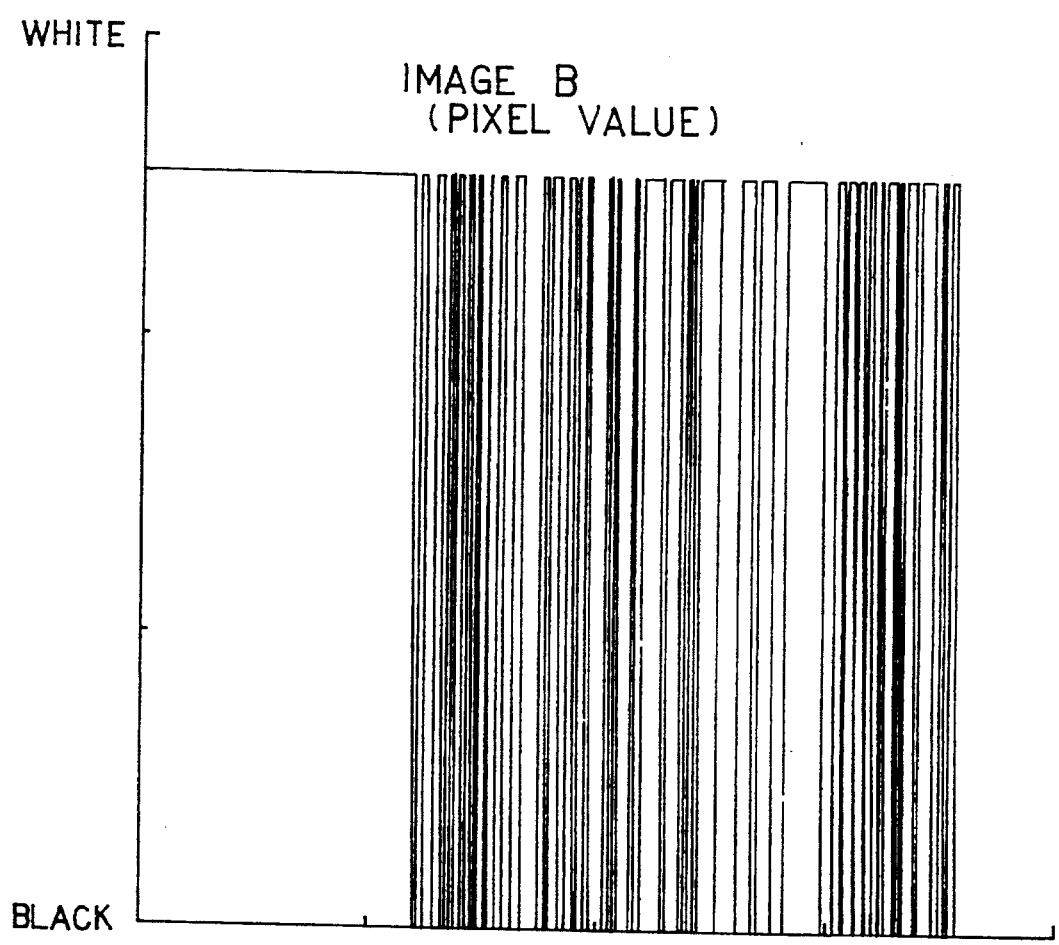
FIG. 9 is a diagram illustrating changes in the pixel value of an image B which is processed according to the present invention.
Figure 10:
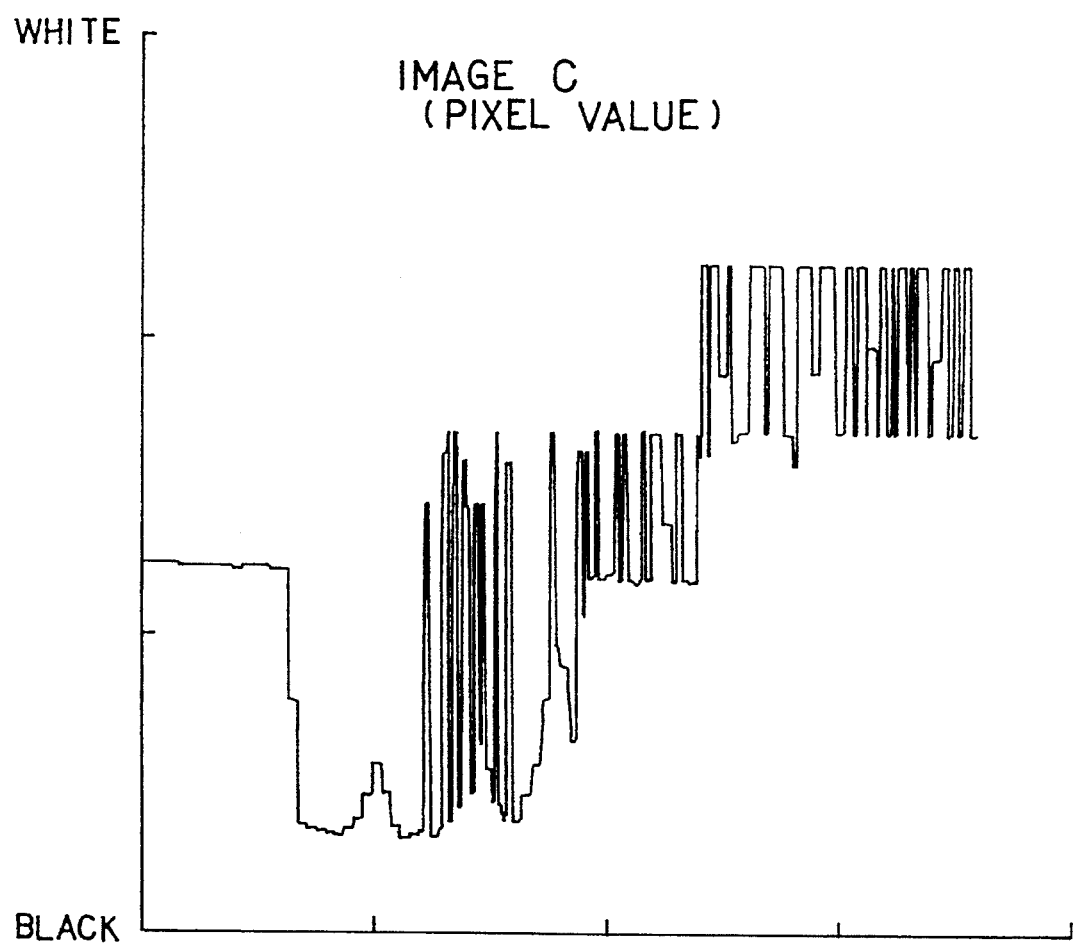
FIG. 10 is a diagram illustrating changes in the pixel value of an image C which is processed according to the present invention.
Figure 11:
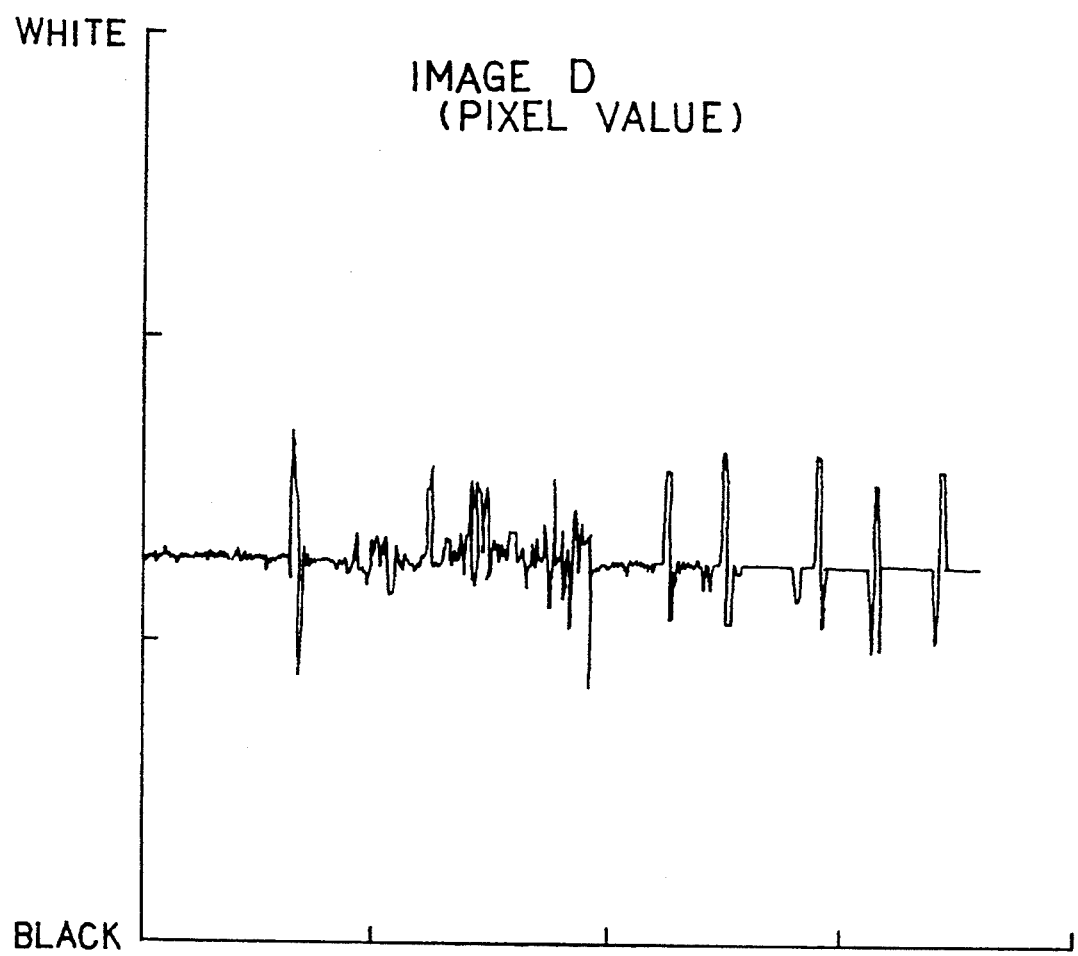
FIG. 11 is a diagram illustrating changes in the pixel values of an image D which is processed according to the present invention.
Figure 12:
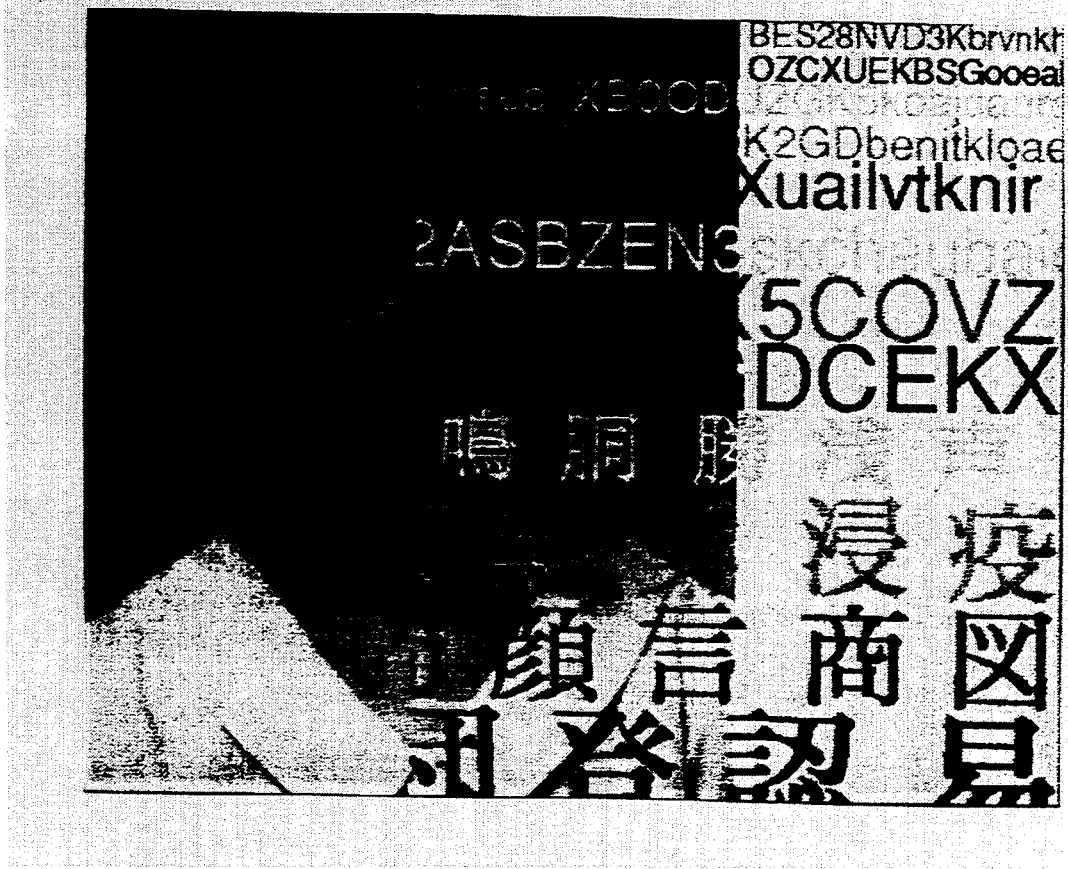
FIG. 12 is a diagram illustrating, as a monochrome image, an example of the image S which is processed according to the present invention.
Figure 13:
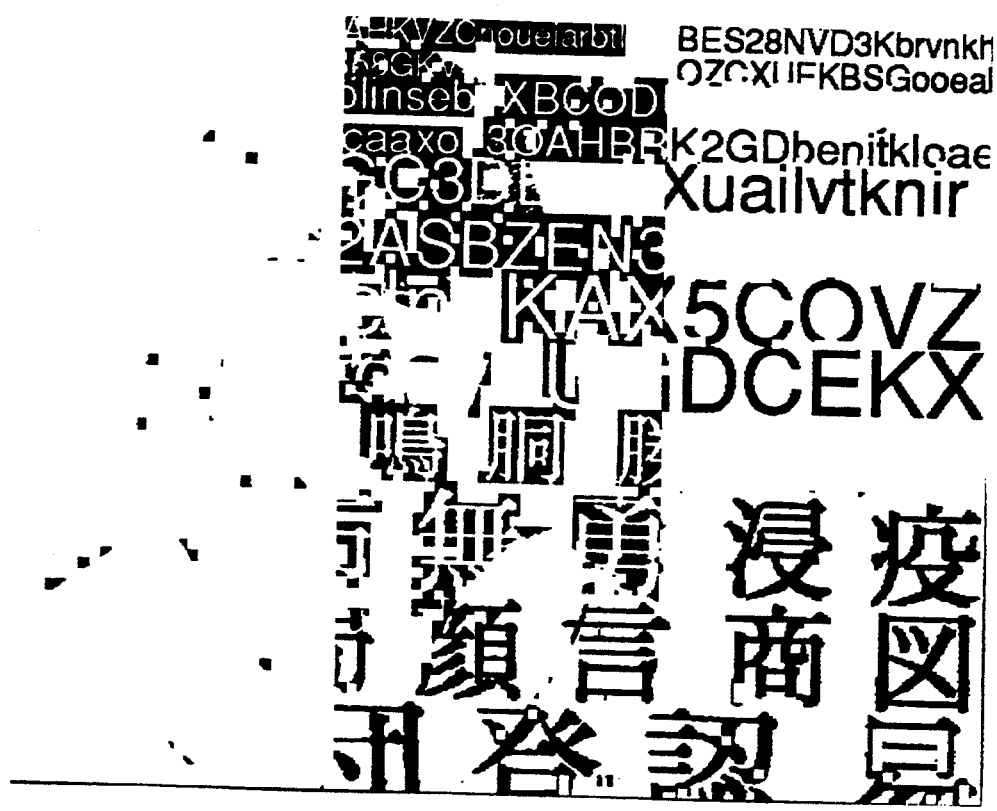
FIG. 13 is a diagram illustrating, as a monochrome image, an example of the image B which is processed according to the present invention.
Figure 14:
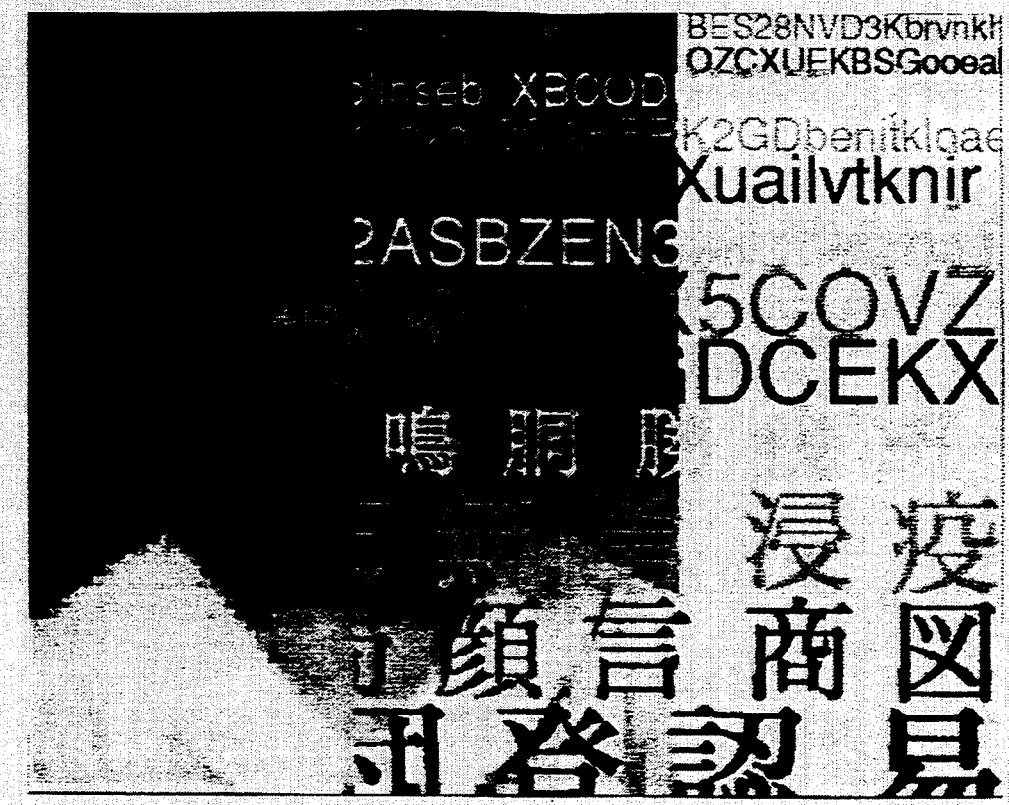
FIG. 14 is a diagram illustrating, as a monochrome image, an example of the image C which is processed according to the present invention.
Figure 15:
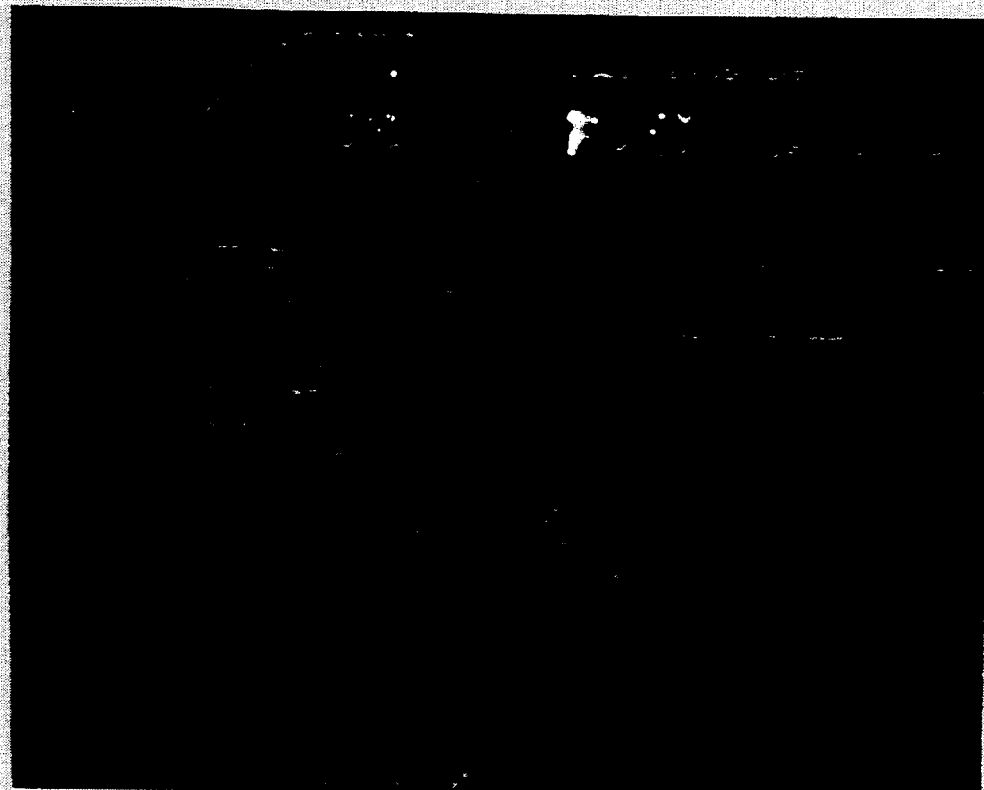
FIG. 15 is a diagram illustrating, as a monochrome image, an example of the image D which is processed according to the present invention.

FIGS. 7(a) through (d) show, by way of example, a sequence of steps involved in the above-described coding process. In FIG. 7(a), the original image S is composed of three pixel blocks, a first one of them being a non-letter area and second and third blocks letter areas. Black hook-shaped portion in the letter area, indicated by hatching, is the actual letter portion (a binary portion).

FIG. 7(b) shows the bi-level image B of the original image S. The white portions are represented by the pixel value "1" and the black portion by the pixel value "0". The pixel block 1 is not subjected to the bi-level coding, and hence the pixel values therein are all replaced with the pixel value "1".

FIG. 7(c) shows the image C obtained from the bi-level image B. The bi-level pixel value "1" is replaced with the value Sh and the bi-level pixel value "0" is replaced with the value Sl.

FIG. 7(d) shows the image D produced on the basis of the original image S and the image C. By subtracting the pixel values of the image C from the corresponding pixel values of the original image S, it is possible to obtain the color image D without the black hook-shaped portion which is the letter area. In practice, such a color image is produced for each of the color components y, cb and cr. In the above the three pixel blocks, which form the image, are handled as one body in the image processing, but in practice the image is processed for each pixel block.

The image B, the pieces of tone information Sh and Sl and the image D', obtained as described above, are coded and sent to a decoding side, where they are decoded (B, Sh, Sl, D'). The decoded image B and pieces of tone information Sh and Sl are used to restore or regenerate the image C, and the thus restored image C and the image D' are synthesized (i.e. added) into an image S''.

Next, a description will be given of the decoding.

The pieces of coded data, that is, the binarized data, the pieces of tone information Sh and Sl and the images Dy, Dcb and Dcr are decoded by bi-level decoders to generate the images Bl and D'. The bi-level image B and the pieces of tone information Sh and Sl are used to generate the image C wherein the pixels of the bi-level image B are each replaced by the simple mean pixel value Sh or Sl, depending on whether the pixel value is "1" or "0". The image C thus obtained and the image D' are added or combined into the image S'' decoded from the image S.

An image read out by a scanner has a property that edges of a letter are blunt at the boundary between the letter and its background, that is, unnecessary high-frequency components get mixed in the image D. This can be solved by such a method as mentioned below. On the coding side the image D is refined and is then coded by a natural image coder in order to prevent the image D from acquiring a property different from that of an ordinary natural image, that is, to remove the above-mentioned high-frequency components which make blunt letter edges in the image D. On the decoding side, the image D' decoded by the natural image decoder is subjected to image restoration processing.

For instance, each pixel value Bi, j in pixel blocks of the bi-level image B is used to change an equation for generating the corresponding pixel value Di, j of the image D to reduce its variation. To this end, the coding side and the decoding side perform processing on the basis of the following equations:

$$D_{i,j} = S_{i,j} - C_{i,j} + P \quad (B_{i,j} = 1)$$
$$= C_{i,j} - S_{i,j} + P \quad (B_{i,j} = 0)$$

(Maximum value $x$ of $P = S_{i,j}$ is 0.5)

and $$S_{i,j} = D'_{i,j} - C_{i,j} + P \quad (B'_{i,j} = 1)$$
$$= C_{i,j} - D'_{i,j} + P \quad (B'_{i,j} = 0)$$

(Maximum value $x$ of $P = S_{i,j}$ is 0.5)

Embodiment 1

FIG. 1 illustrates in block form a system for implementing the coding method according to the present invention. Reference numeral 1 denotes an image blocking circuit, 2 an image binarizer, 3 an image synthesizer, 4 a differential image producing circuit, 5 a bi-level image coder, 6 a coder, 7 a conventional natural image coder, and a signal output circuit.

The image blocking circuit 1 divides the original image S into pixel blocks each formed by an array of pixels with 8 rows and 8 columns (=64 pixels). The thus divided pixel blocks, which form an image S', are sequentially provided to a letter area decision circuit 9. In the letter area decision circuit 9 the image S' received from the image blocking circuit 1 is analyzed for each pixel block and an instruction signal is provided to the image binarizer 2 to effect that only a pixel block decided to have a letter is coded to bi-level form.

Figure 4:
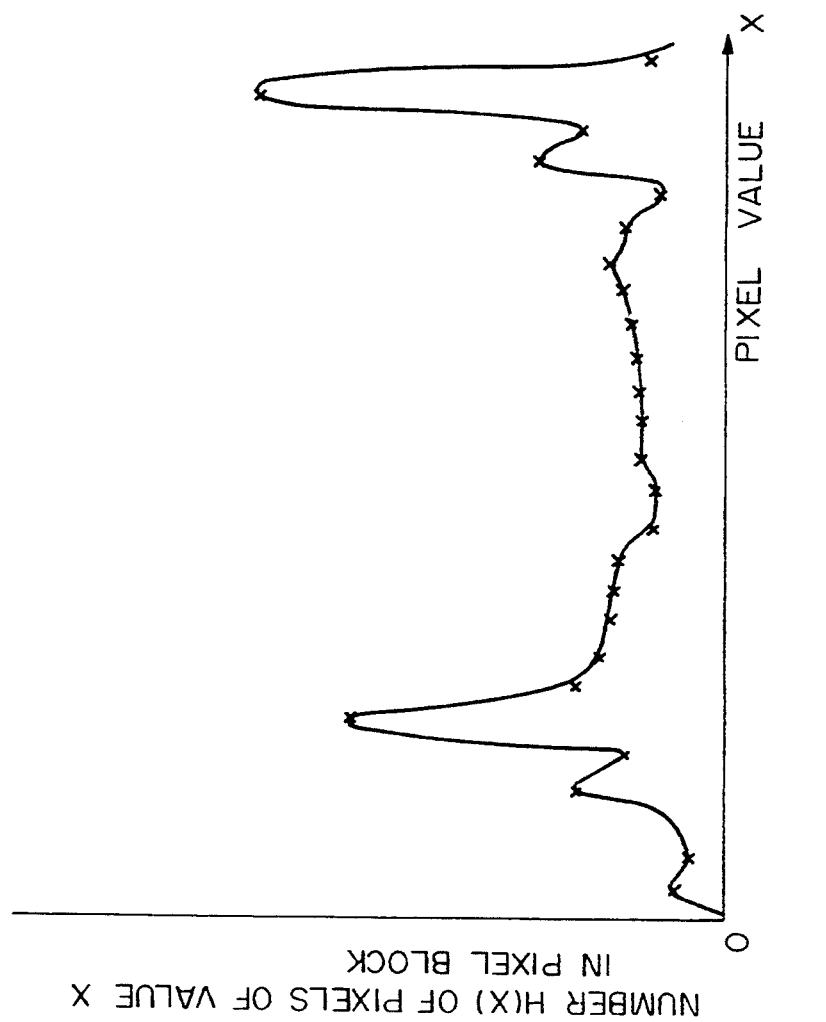
FIG. 4 is a graph showing the distribution of pixel values in a pixel block.

The letter area decision circuit 9 is a circuit whereby a maximum pixel value and a minimum pixel value in the pixel block are detected, and the pixel block is decided to be a letter or non-letter area, depending on whether a difference between the maximum value and the minimum value is very large or nearly equal to zero. When the pixel block cannot be decided as to whether it is a letter or non-letter area, the afore-mentioned histogram, shown in FIG. 4, is used to check the distribution of pixel values in the pixel block. That is, the number of pixels of the value x, which satisfies the following condition, is obtained with the histogram, using the threshold value (or parameter).

$$H(x-1) - H(x) > M \text{ and } H(x) - H(x+1) > M$$

Such a pixel value is regarded as a peak of the pixel value distribution. When one or two such peak values x are found, the pixel block is decided to be a letter area, and if not, it is decided to be a non-letter area.

The above-described letter area decision circuit is merely an illustrative example and it is also possible to employ circuits of the type utilizing the maximum pixel value and the minimum pixel value. In this embodiment, the reduction of the number of images which are processed by the image binarizer 2 serves to decrease the number of coding bits for coding the image B and the value Sh and Sl.

The image binarizer 2 receives the divided pixel blocks from the image blocking circuit 1 and computes, for each block, the mean value Sa of the pixel values in the block. Then, the circuit 2 produces, for each block, the image B wherein the pixels of the image S' are each converted to a value "1" or "0", depending on whether its pixel value is greater or smaller than the means value Sa. The image B is provided to the image synthesizer 3 and the bi-level image coder 5. At the same time, the mean value Sh of the pixel values greater than the mean value Sa and the mean value Sl of pixel values smaller than the mean value Sa are computed for each block, and these mean values Sh and Sl are provided to the image synthesizer 3 and the coder 6.

The image synthesizer 3 uses the image B from the image binarizer 2 and the mean values Sh and Sl to produce the image C wherein all the pixel values of the image B are replaced by the mean value Sh or Sl, depending on whether they are "1" or "0". The image C thus produced is sent to the differential image producing circuit 4.

The differential image producing circuit 4 produces the image D which has pixel values obtained by subtracting the pixel values of the image C from the pixel values of the image S. The image D is provided to the natural image coder 7.

The bi-level image coder 5 encodes the image B received from the image binarizer 2 and sends the coded data Bc to the signal output circuit 8. The bi-level image coder 5 may be formed by conventional coders such as JBIG and MMR.

The coder 6 encodes the mean values Sh and Sl received from the image binarizer 2 and sends the coded data Shc and Slc to the signal output circuit 8. The coder 6 may be formed by a coder of the DPCM system which encodes the difference in mean value between current and preceding blocks.

The natural image coder 7 encodes the image D received from the differential image producing circuit 4 and sends the coded data Dc to the signal output circuit 8. The natural image coder 7 may be formed by a conventional DCT coder.

The signal output circuit 8 receives pieces of coded data Bc, Shc, Slc and Dc from the bi-level image coder 5, the coder 6 and the natural image coder 7 and outputs a signal in a specified format.

Figure 2:
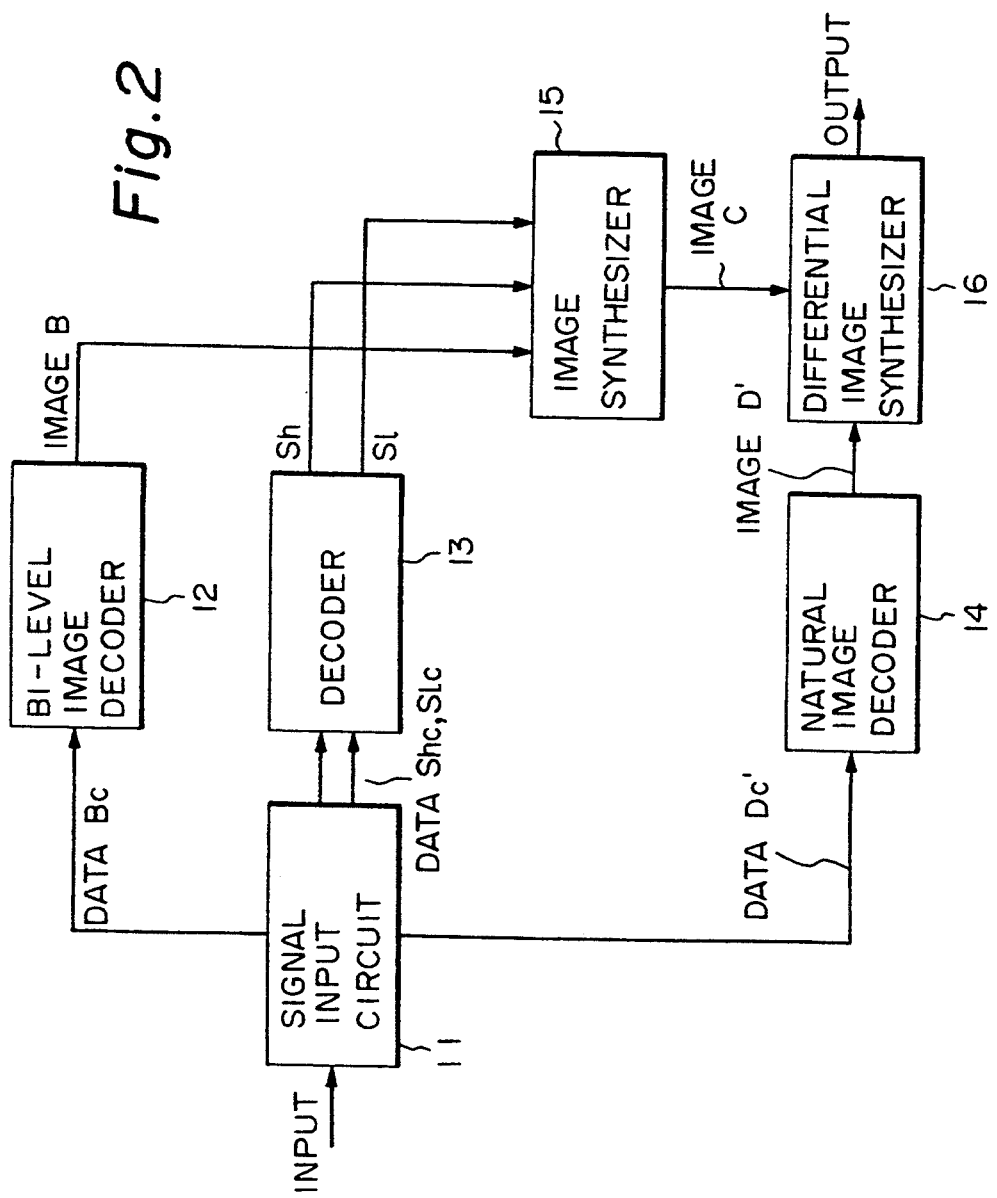
FIG. 2 is a block diagram of a decoding apparatus for receiving a coded image train transmitted in accordance with the present invention.

FIG. 2 illustrates in block form a decoding apparatus for an image signal coded by the coding method according to the present invention. Reference numeral 11 denotes a signal input circuit, 12 a bi-level image decoder, 13 a decoder, 14 a natural image decoder, 15 an image synthesizer and 16 a differential image synthesizer. The signal input circuit 11 receives a coded signal and produces the pieces of coded data Bc, Shc, Slc and Dc'. The data Bc is applied to the bi-level image decoder 12, the data Shc and Slc to the decoder 13, the data Dc' to the natural image decoder 14. The bi-level image decoder 12 decodes the data Bc received from the signal input circuit 11 and sends the decoded image B to the image synthesizer 15.

The bi-level image decoder 12 may be formed by a JBIG of MMR decoder corresponding to the bi-level image coder 5 in FIG. 1. The decoder 13 decodes the pieces of data Shc and Slc received from the signal input circuit 11 and sends the decoded pieces of data Sh and Sl to the image synthesizer 15. The decoder 13 may be formed by a DPCM decoder corresponding to the coder 6 in FIG. 1.

The natural image decoder 14 decodes the data Dc' received from the signal input circuit 11 and sends the decoded image D' to the differential image synthesizer 16. The natural image decoder 14 may be formed by a DCT decoder corresponding to the coder 7 in FIG. 1.

The image synthesizer 15 synthesizes the image C on the basis of the image B and the pieces of data Sh and Sl received from the binary image decoder 12 and the decoder 13, respectively, and sends the synthesized image to the differential image synthesizer 16. The image synthesizing method is exactly the same as in the case of the image synthesizer 3 in FIG. 1.

The differential image synthesizer 16 outputs, as a decoded image, the image S" which has pixel values obtained by adding those of the images C and D' received from the image synthesizer 15 and the natural image synthesizer 14, respectively.

FIGS. 8 through 11 show samples of the original image S. FIG. 8, 9, 10 and 11 respectively show signals of the original image S and the images B, C and D when the hundredth one of 516 pixels in the vertical or column direction was coded horizontally.

According to the present invention, when the original images contains a letter, the letter area is encoded into the image B, using the mean values Sh and Sl separately of each other, and the image C corresponding to the thus coded image is removed from the original image S. With this method, the letter area is less deteriorated than in the case of coding the image S directly by a DCT coder.

Embodiment 2

Figure 3:
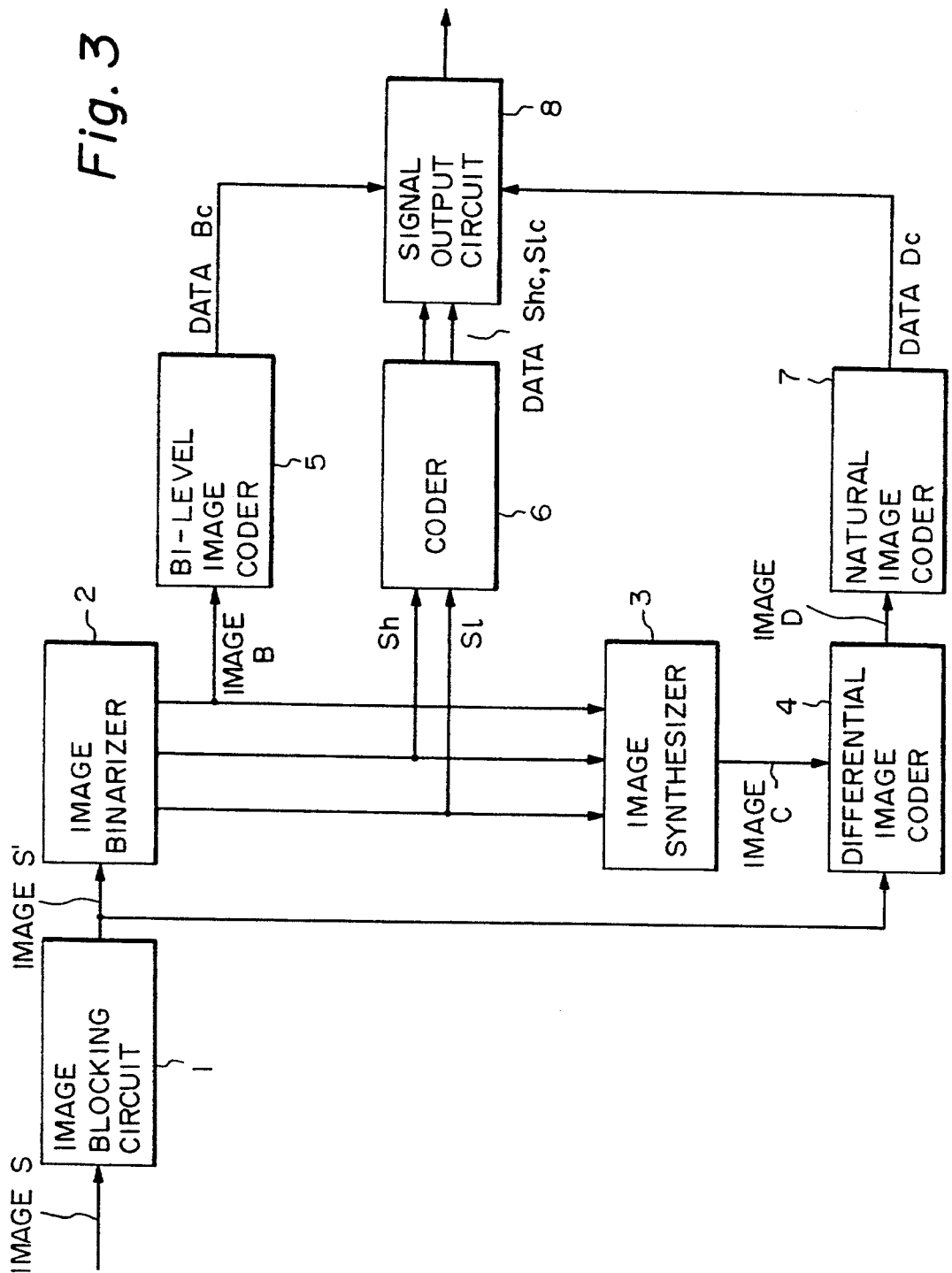
FIG. 3 is a block diagram of another example of the coding apparatus embodying the present invention.

FIG. 3 illustrates in block form another embodiment of the present invention in which the letter area decision circuit 9 in Embodiment 1 is omitted. In this embodiment, the bi-level coding and the natural image coding are conducted for all pixels of the image S', but no letter area identification processing by the letter area decision circuit 9 is performed, of course. The circuits 1 through 8 are the same as those in Embodiment 1.

Embodiment 3

Figure 5:
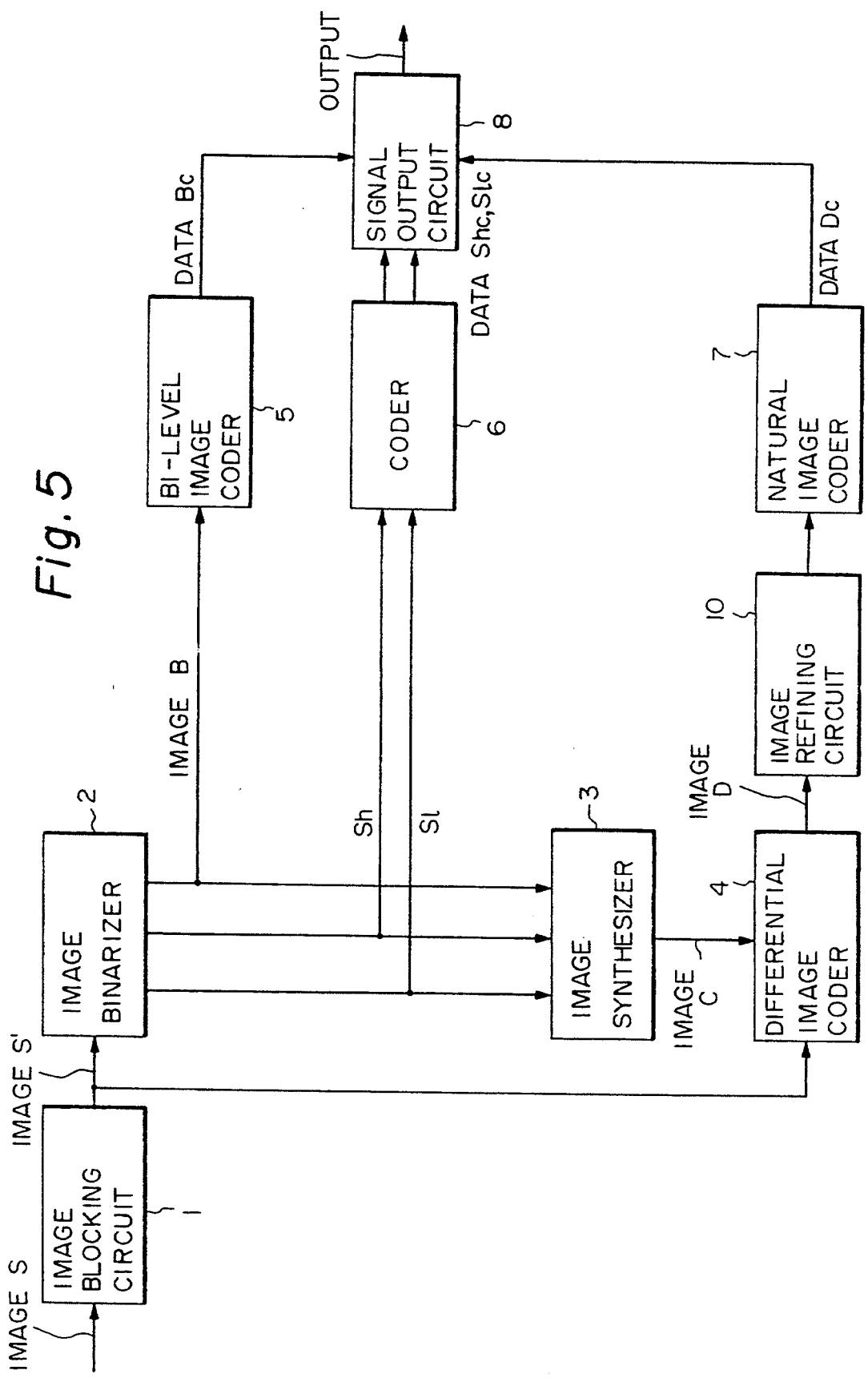
FIG. 5 is a block diagram of another example of the coding apparatus embodying the present invention.

FIG. 5 illustrates in block form another embodiment of the present invention, in which an image refining circuit 10 is added to Embodiment 2. The circuits 1 through 8 are the same as those used in Embodiment 2. The image refining circuit 10 refines the image D received from the differential image producing circuit 4 to allow efficient coding of a high-frequency component dominated area which is not suited to the natural image coder. The thus refilled image D is sent to the natural image coder 7.

The image refining circuit 7 can be formed by, for example, a circuit which changes the image D producing method in accordance with the pixel value of the image B. When the pixel value of the image B is "1", the image D is produced as in the case of Embodiment 1, and when the pixel value of the image B is "0", the image S is subtracted from the image C to produce the image D.

Figure 6:
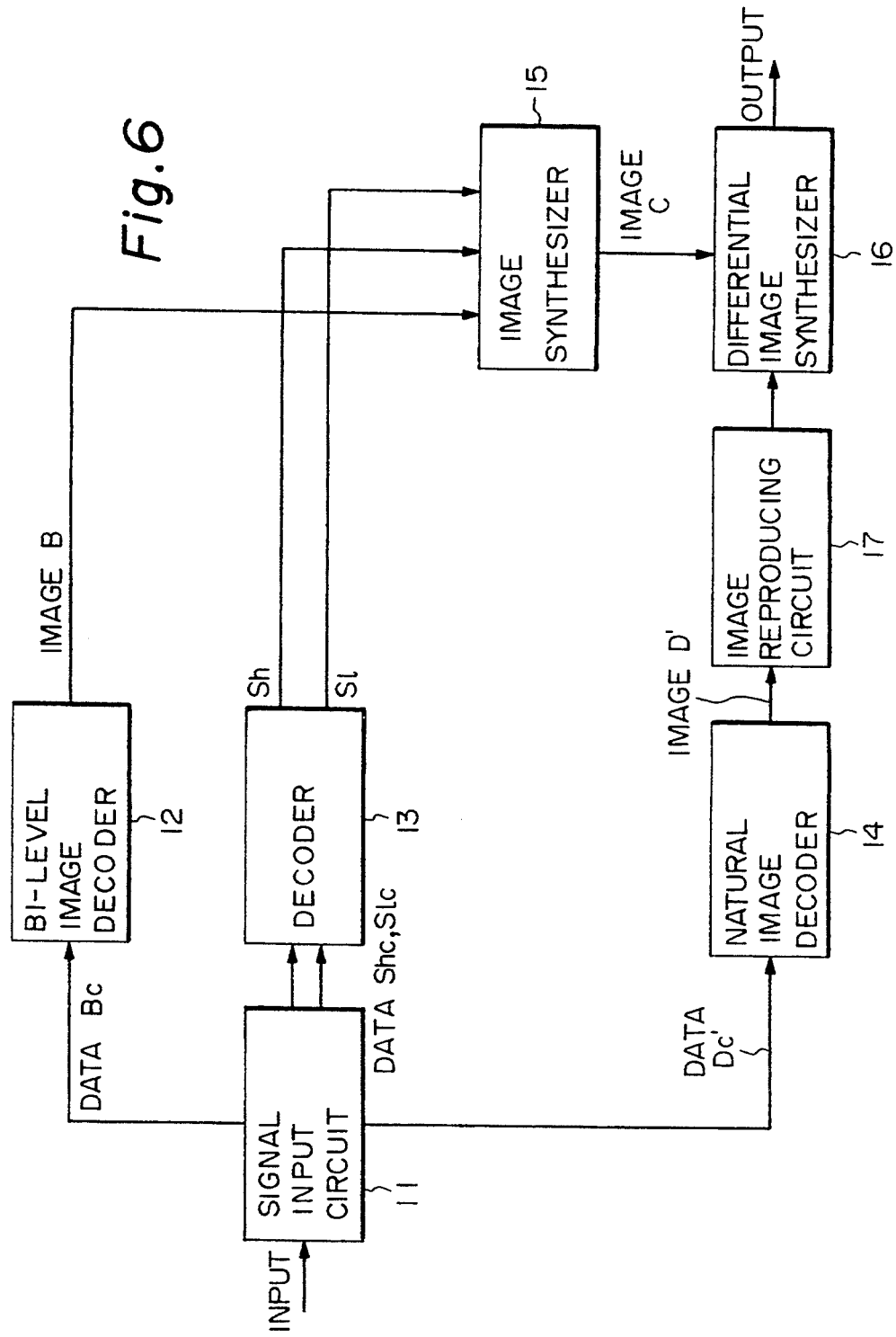
FIG. 6 is a block diagram of another example of the decoding apparatus for receiving a coded image train transmitted from the example illustrated in FIG. 5.

FIG. 6 illustrates in block form a decoding apparatus for decoding the image encoded by the image refining circuit 7. The circuits 11 through 16 are the same as those used in the decoding apparatus depicted in FIG. 2. Reference numeral 17 indicates an image reproducing circuit, whereby the image D' received from the natural image decoder 14 is recovered from the refining processing performed by the image refining circuit 10 in FIG. 5.

The image refining circuit 10 and the image reproducing circuit 17 mentioned above are merely illustrative thereof and can also be formed by other circuits which serve the purpose.

This embodiment improves the coding efficiency of the natural image coder and can be applied to Embodiment 1.

FIGS. 12 through 15 show concrete examples of the images S, C and D processed in accordance with the present invention.

In the high efficiency coding system of the present invention for a still natural image mingled with a bi-level image, in the case of coding grayscale or color image which is an original image to be coded, a differential image is produced by the bi-level image mingled still image coding system, the original image and the differential image are compared with each other for each pixel block, only those of the pixel blocks which are predicted to be coded by the bi-level image mingled still image coding system more efficiently than in the case of the natural image coding system are encoded by the bi-level image mingled still image coding system, and the other pixel blocks are encoded by the natural image coding system.

At the encoding of the bi-level image mingled still image coding system, the original image is divided into pixel blocks, which are classified by the method described below into those to be encoded by the bi-level image mingled still image coding system and those to be encoded by the natural image coding system.

Following the letter area decision of the original image, each block decided to contain a letter area is subjected to image bi-level coding and shaded image production processing by the bi-level image mingled still image coding system, thereby producing a differential image. The pixel blocks of the original image and the differential image are sent to a coding evaluation part, wherein it is evaluated by the following method, for each pixel block, how much the image quality has been improved by the use of the bi-level image mingled still image coding system. In a conventional DCT quantization table, the step size usually becomes larger as the frequency component rises. In a block in which the pixel value undergoes a sudden change like a letter edge, many high-frequency components are generated, in which case the use of the above-mentioned quantization table will result in serious deterioration of the image quality.

One possible solution to this problem is a method whereby when the change in the pixel value in the pixel block of the differential image is smaller than in the pixel block of the original image, it is evaluated that the image quality has been improved by the use of the bi-level image mingled still image coding system.

According to another possible method, the original image and the differential image are DCT coded and then decoded and they are compared with each other before and after the coding to check whether the deterioration of the image quality was suppressed.

As for the pixel block decided not to be coded by the bi-level image mingled still image coding system, on the basis of the result of the coding evaluation, the produced differential image is not used but instead the original image is coded intact by the natural image coding system. Finally, the bi-level image mingled still image coding system or the natural image coding system is applied to each pixel block. The decoding side in this case is the same as that of the bi-level image mingled still natural image coding system.

Embodiment 4

FIG. 16 illustrates in block form a system which implements the coding method according to the present invention. The circuits 1 through 9 are the same as those used in Embodiment 1. Reference numeral 18 indicates a coding-estimating circuit. The image blocking circuit 1 divides the original image S into pixel blocks each 64 pixels with 8 rows and 8 columns, for instance. The image S' composed of all divided pixel blocks is provided to the letter area decision circuit 9. The letter area decision circuit 9 analyzes the image S' for each pixel block and instructs the image binary coder 2 to perform bi-level coding for only the pixel blocks decided to contain letters.

The image binarizer 2 receives the divided pixel blocks from the image blocking circuit 1 and, for each block, computes the mean value Sa of the pixel values of the pixels contained in the block. Then, the image binarizer 2 produces, for each block, the image B wherein the pixels of the image S' have been converted to pixels "1" or "0", depending on whether they are greater or smaller than the mean value Sa. The image B thus produced is provided to the image synthesizer 3 and the bi-level image coder 5. At the same time, the image binarizer computes, for each block the mean value Sh of the pixel values greater than the value Sa and the mean value Sl of the pixel values smaller than the value Sa. These values Sh and Sl are transferred to the image synthesizer 3 and the differential value coder 6.

The image synthesizer 3 uses the image B received from the image binarizer 2 and the means values Sh and Sl for each block to produce the image C wherein every pixel value of the image B has been replaced by the mean values Sh and Sl of the block in which the pixel is contained, depending on whether the pixel value is a "1" or "0". The image C is provided to the differential image producing circuit 4.

The differential image producing circuit 4 produces the image D which has pixel values obtained by subtracting the pixel values of the image C from the pixel values of the image S'. The image D is provided to the natural image coder 7.

The coding-estimating circuit 18 uses the differential image D from the differential image producing circuit 4 and the original image S' from the image blocking circuit 1 to estimate the effect of the bi-level image still image coding system for each block. When it is decided that the effect of the bi-level image mingled still image coding system has not been produced in the pixel block, the circuit 18 instructs the natural image coder 7 to encode the original image in place of the differential image and, at the same time, it instructs the bi-level image coder 5 and the coder 6 not to encode the image B produced from the image block concerned and the mean values Sh and Sl.

The coding-estimating circuit 18 can be formed such a circuit described below.

A difference between one pixel and each of the adjoining pixels in each pixel block of the original image and the differential image is squared so that the squared values are all added to obtain a value d. Then, calculated values dS and dD in the original image S and in the differential image D are compared with each other so that the following decision is made using a parameter f.

If $dS >= f^*dD$: bi-level image mingled still image coding system

If $dS < f^*dD$: natural image coding system

The above-described coding-estimating circuit is only an illustrative example thereof and may also be formed by the following circuit. That is, the respective pixel blocks of the original image and the differential image are encoded and decoded to produce pixel blocks by the conventional DCT system, the squares of changes in the pixel values caused by the DCT system are computed and the computed values are all added to obtain a value r. Then calculated values rS and rD in the original image and in the differential image are compared with each other so that the following decision is made using the parameter f.

If $rS >= f^*rD$: bi-level image mingled still image coding system

If $rD < f^*rD$: natural image coding system

The bi-level image coder 5 codes the image B received from the image binarizer 2 and provides the coded data Bc to the signal output circuit 8. The bi-level image coder 5 may be formed by the conventional JBIG and MMR coders.

The coder 6 encodes the mean values Sh and Sl of the pixel values for each block of the image received from the image binarizer 2 and provides the coded data Shc and Slc to the signal output circuit 8. The coder 6 may be formed by the DPCM coder which encodes the difference between the means values of the current and preceding blocks.

The natural image coder 7 encodes the image D received from the differential image producing circuit 4 and provides the coded data Dc to the signal output circuit 8. The natural image coder 7 may be formed by the afore-mentioned conventional DCT coder.

The signal output circuit 8 receives the pieces of coded data Bc, Shc, Slc and Dc from the binary image coder 5, the coder 2 and the natural image coder 7 and outputs a signal in a specified format.

According to the present invention, when the original image S is an image mingled with letters, the coding efficiency of the image S through utilization of the coding-estimating circuit is higher than in the case of coding the image S by the use of the conventional binary image mingled still image coding system.

Embodiment 5

FIG. 17 illustrates in block form still another embodiment of the present invention, in which the letter area decision circuit 9 in Embodiment 4 is omitted. The circuits 1 through 8 and 18 are the same as those used in Embodiment 1. This embodiment is somewhat inferior to the FIG. 1 embodiment in terms of coding efficiency but possesses such an advantage that a coded image with less deterioration can be obtained from an original image in which the edge area is very blunt.

As described above, according to the present invention, an original grayscale image or color image is rendered into bi-level form for each pixel block, the bi-level image is coded by a coder which does not inflict any information loss on the image and an image obtained by removing the bi-level image from the original image is coded by a DCT coder. This permits deterioration-free coding of the grayscale or color image containing letter areas.

Moreover, according to the present invention, a differential image is produced for each block of the grayscale or color image containing letter areas, by use of the bi-level image mingled still image coding system, the original image and the differential image are compared with each other to estimate the improvement of the image quality by the bi-level image mingled still image coding system, only those pixel blocks estimated to have been improved are coded by the binary image mingled still image coding system, and the other pixel blocks are coded by the natural image coding system. By this, the image quality can be suppressed in the coding of the grayscale image and color image containing letter areas.

The signal-to-noise (SN) ratio and the reduction in the number of coding bits by the present invention are given in the following table.

TABLE 1

| Image | Method | Total (bytes) | JPEG (bytes) | JBIG (bytes) | DPCM (bytes) | S/B (dB) |
|---|---|---|---|---|---|---|
| Color Bi-level Letter | JPEG | 42248 | — | — | — | 31.2 |
| | NEW 1 | 23444 | 12259 | 5433 | 5752 | 40.0 |
| | NEW 2 | 23439 | 15700 | 6065 | 1696 | 40.6 |

TABLE 1-continued

| Image | Method | Total (bytes) | JPEG (bytes) | JBIG (bytes) | DPCM (bytes) | S/B (dB) |
|---|---|---|---|---|---|---|
| | NEW 3 | 20875 | 12702 | 6178 | 1995 | 41.4 |
| Monochrome Scanner | JPEG | 26103 | — | — | — | 35.8 |
| | NEW 1 | 30198 | 21269 | 2425 | 6504 | 35.8 |
| | NEW 2 | 27227 | 27160 | 85 | 32 | 36.7 |
| | NEW 3 | 27185 | 26984 | 91 | 110 | 36.7 |
| Monochrome Edge Emphasized (Weak) | JPEG | 40049 | — | — | — | 32.2 |
| | NEW 1 | 41636 | 29236 | 5003 | 7397 | 32.4 |
| | NEW 2 | 39105 | 36210 | 2769 | 126 | 33.1 |
| | NEW 3 | 40046 | 34960 | 4963 | 123 | 33.5 |
| Monochrome Edge Emphasized (Strong) | JPEG | 49019 | — | — | — | 30.8 |
| | NEW 1 | 43529 | 30157 | 5835 | 7536 | 31.9 |
| | NEW 2 | 43529 | 30157 | 3745 | 1745 | 31.9 |
| | NEW 3 | 46211 | 36748 | 6396 | 3067 | 32.2 |

In the above, JPEG indicates the JPEG system, NEW 1 an example of the bi-level image mingled still image coding system in FIG. 1, NEW 2 the case of using the estimating circuit shown in FIG. 6, and NEW 3 the case of using the estimating circuit depicted in FIG. 17.

The SN ratio in the above table is defined as follows:

$$S/N = 20 \log_{10} \frac{255}{\sqrt{\frac{\sum_{j,i}^{M,N} (S_{j,i} - d_{i,j})^2}{MN}}} \ (dB)$$

where $S_{j,i}$ is the pixel value of the original image, $d_{i,j}$ is the pixel value of a coded/decoded image, M,N are the numbers of pixels on the rows and columns, and 255 is the largest possible pixel value.

As described above in detail, according to the present invention, a differential image is produced, for each block, from a grayscale image or color image by use of a bi-level image mingled still image coding system, the original image and the differential image are compared with each other to estimate the improvement of the image quality by the bi-level image mingled still image coding system, only those of the pixel blocks of the improved image quality are coded by the bi-level image mingled still image coding system, and the other blocks are encoded by the natural image coding system. This permits high efficiency coding of the grayscale image and the color image, containing letter areas while suppressing the deterioration of its image quality.

What we claim is:

1. A bi-level image mingled still image coding method comprising
dividing an original still color image or grayscale image into a plurality of pixel blocks (n×m pixels), pixels of each block being detected as a bi-level image area or a pixel block containing a bi-level image area, each pixel said detected block being rendered into a bi-level form by the use of a threshold value (Sa) to produce as a bi-level coded output, said pixel blocks other than those in which a difference between a maximum pixel value and a minimum pixel value is substantially zero being detected as said bi-level image blocks or pixel blocks containing a bi-level image portion;
replacing such coded pixel value of each pixel block of said original image by a specified calculated value based on said each pixel value to produce a calculated value coded output obtained by coding said replaced calculated value, a mean value (Sh) of said pixel values in said each pixel block or a mean value (Sl) of said pixel value in said each pixel block being used as said calculated value depending on whether said pixel values in said each pixel block are greater or smaller than said threshold value (Sa);

producing a difference between said coded pixel value of each pixel block of said original image and said calculated value coded output as a natural coded output; and obtaining a combined output by synthesizing said bi-level coded output, said calculated value coded output and said natural image coded output as the coded output of said original still color image or grayscale image.

2. A bi-level image mingled still image coding method comprising:

dividing an original still color image or grayscale image into a plurality of pixel blocks (n×m pixels), pixels of each block being detected as a bi-level image area or a pixel block containing a bi-level image area, each pixel of said detected block being rendered into a bi-level form by the use of a threshold value (Sa) to produce as a bi-level coded output, the distribution of pixel values in each of said pixel blocks being calculated so that a block in which said pixel values have centered on one or two specified values is detected as said bi-level image area or pixel block containing said bi-level image area;

replacing such coded pixel value of each pixel block of said original image by a specified calculated value based on said each pixel value to produce a calculated value coded output obtained by coding said replaced calculated value, a mean value (Sh) of said pixel values in said each pixel block or a mean value (Sl) of said pixel values in said each pixel block being used as said calculated value depending on whether said pixel values in said each pixel block are greater or smaller than said threshold value (Sa);

producing a difference between said coded pixel value of each pixel block of said original image and said calculated value coded output as a natural coded output; and obtaining a combined output by synthesizing said bi-level coded output, said calculated value coded output and said natural image coded output as the coded output of said original still color image or grayscale image.

3. A bi-level image mingled still image coding method comprising:

dividing an original still color image or grayscale image into a plurality of pixel blocks (n×m pixels), pixels of each block being detected as a bi-level image area or a pixel block containing a bi-level image area, each pixel of said detected block being rendered into a bi-level form by the use of a threshold value (Sa) to produce as a bi-level coded output;

replacing such coded pixel value of each pixel block of said original image by a specified calculated value based on said each pixel value to produce a calculated value coded output obtained by coding said replaced calculated value, a mean value (Sh) of said pixel values in said each pixel block or a mean value (Sl) of said pixel values in said each pixel block being used as said calculated value depending on whether said pixel values in said each pixel block are greater or smaller than said threshold value (Sa);

producing a difference between said coded pixel value of each pixel block of said original image and said calculated value coded output as a natural coded output; and obtaining a combined output by synthesizing said bi-level coded output, said calculated value coded output and said natural image coded output as the coded output of said original still color image or grayscale image, in case of said natural image coding, an unnecessary high-frequency component being removed from a pixel value obtained by subtracting from the corresponding pixel of said original image a pixel value replaced by a pixel at an edge area of a natural image according to tone information, thereby preventing said pixel at said edge area from becoming blunt.

* * * * *